United States Patent
Euverard

[11] 3,809,207
[45] May 7, 1974

[54] CONVERGING AND DIVERGING CONVEYOR

[75] Inventor: Maynard R. Euverard, Clarendon Hills, Ill.

[73] Assignee: Velten & Pulver, Inc., Chicago Ridge, Ill.

[22] Filed: Dec. 11, 1972

[21] Appl. No.: 313,660

[52] U.S. Cl. ............................................... 198/34
[51] Int. Cl. ............................................. B65g 47/26
[58] Field of Search ..................................... 198/34

[56] References Cited
UNITED STATES PATENTS
3,148,761   9/1964   Niederer et al. ..................... 198/34
2,545,667   3/1951   Malnati ................................ 198/34

Primary Examiner—Richard E. Aegerter
Assistant Examiner—Joseph E. Valenza
Attorney, Agent, or Firm—Prangley, Dithmar, Vogel, Sandler & Stotland

[57] ABSTRACT

A conveyor for converging and diverging a row of articles wherein a plurality of elastic supports are movable along a predetermined path and provide a plurality of support points for the articles. An adjustable guide structure is provided for controlling movement of the ends of the elastic supports in a direction transverse to the predetermined path along with means for maintaining contact between the ends of the elastic supports and the adjustable guide structure. Drive mechanism moves the elastic supports along the predetermined path. The elastic supports provide support points for the articles which converge and diverge according to the position of the guide structure as the elastic supports move from the infeed end of the conveyor to the discharge end of the conveyor.

7 Claims, 7 Drawing Figures

CONVERGING AND DIVERGING CONVEYOR

This invention relates to a converging and diverging conveyor and more particularly to a plurality of rows of supports providing a conveying surface which converges and diverges as the ends of each row are moved toward and away from each other.

A conveyor structure for converging and diverging a row of spaced-apart articles arranged transversely of a predetermined path while traveling between an infeed station and a discharge station, said conveyor comprising a plurality of rows of article supports with each row extending transversely of the predetermined path, the supports in each row interacting so that movement of the supports adjacent to the ends of the row toward and away from each other causes corresponding proportional movement of the intervening supports toward and away from each other, guide structure engaging said end supports adjacent to the ends of each row for moving the engaged end supports toward and away from each other, and drive mechanism for moving said supports along the predetermined path from the infeed station to the discharge station with a row of articles thereon arranged transversely thereof, contact of the engaged end supports with said guide structure so as to move said engaged end supports away from each other correspondingly proportionally increasing the spacing between the intervening supports in each associated row correspondingly to increase the space between articles on said supports, and contact of the engaged end supports with said guide structure so as to move said engaged end supports toward each other correspondingly proportionally decreasing the spacing between the intervening supports in each associated row correspondingly to decrease the space between articles on said supports.

Another object of the present invention is to provide a conveyor of the type set forth in which a fixture is mounted to the ends of each of the elastic supports and has a finger extending therefrom, the elastic supports urging the fingers into contact with the adjustable guide structure as the elastic supports move along the predetermined path.

Still another object of the present invention is to provide a conveyor of the type set forth in which a plurality of elongated rods are movable along the predetemined path between an infeed station and a discharge station and elastic support members are slidably mounted on each of the elongated rods and form a conveying surface for transporting articles thereon as the elongated rods move along the predetermined path.

A further object of the present invention is to provide a conveyor structure for converging and diverging a row of spaced-apart articles arranged transversely of a predetermined path while traveling between an infeed station and a discharge station, said conveyor having a plurality of elongated rods movable along a predetermined path between the infeed station and the discharge station, a spring mounted on each of said elongated rods and extending therealong to form a plurality of support points for transmitting a row of articles thereon during movement of said elongated rods along the predetermined path from the infeed station to the discharge station, a fixture mounted to the ends of each of said springs and having a finger extending therefrom, adjustable guide structure for controlling movement of said fixtures in a direction transverse to the predetermined path to move the support points of said springs toward and away from each other, said springs urging said fingers into contact with said adjustable guide structure as said springs move along the predetermined path, and drive mechanism for moving said elongated rods and said springs carried thereby along the predetermined path from the infeed station to the discharge station, contact of said fingers with said guide structure to move said fixtures away from each other correspondingly proportionately increasing the spacing of the support points of said springs correspondingly to increase the space between articles on said springs, and contact of the fingers with said guide structure to move said fixtures toward each other correspondingly proportionately decreasing the spacing between the support points of said springs correspondingly to decrease the space between articles on said springs.

These and other objects of the present invention will be more readily understood by reference to the following specification taken in connection with the accompanying drawings, in which.

Figure 1:
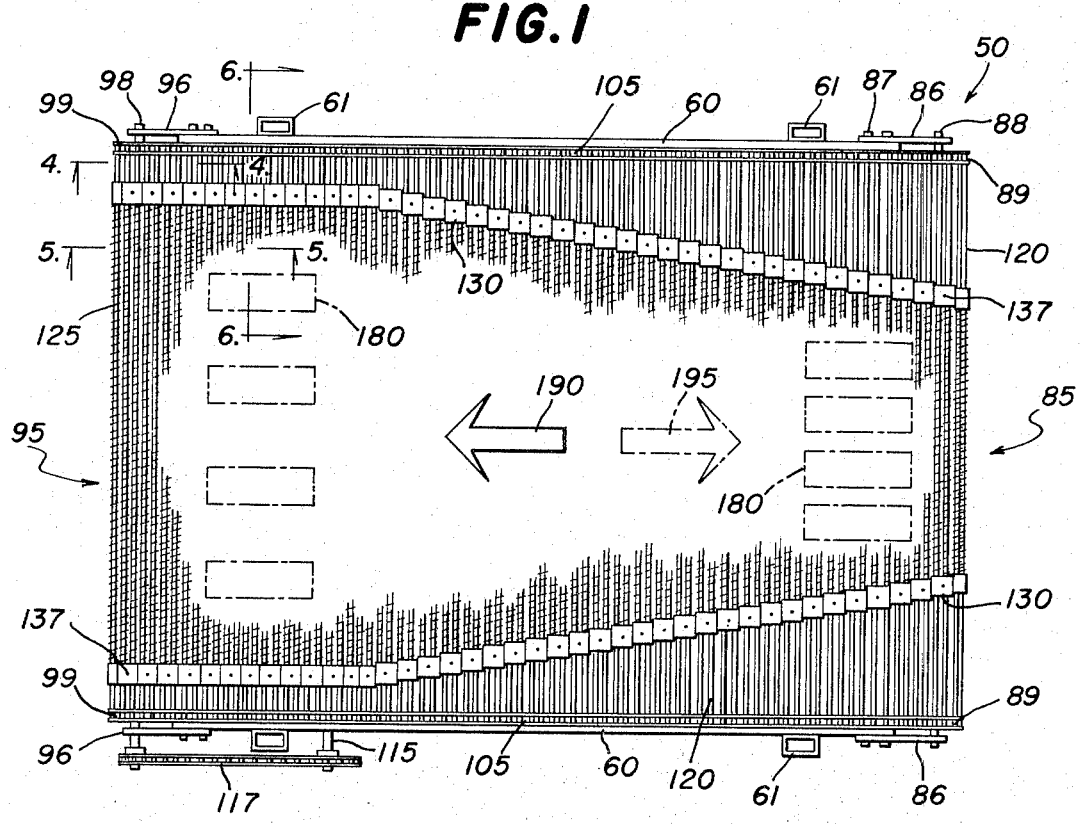
FIG. 1 is a top plan view of the conveyor of the present invention, particularly showing the conveyor surface converging and diverging from the infeed station thereof to the discharge station thereof, the solid arrow showing diverging movement of the conveyor and the dotted arrow showing converging movement of the conveyor.
Figure 2:
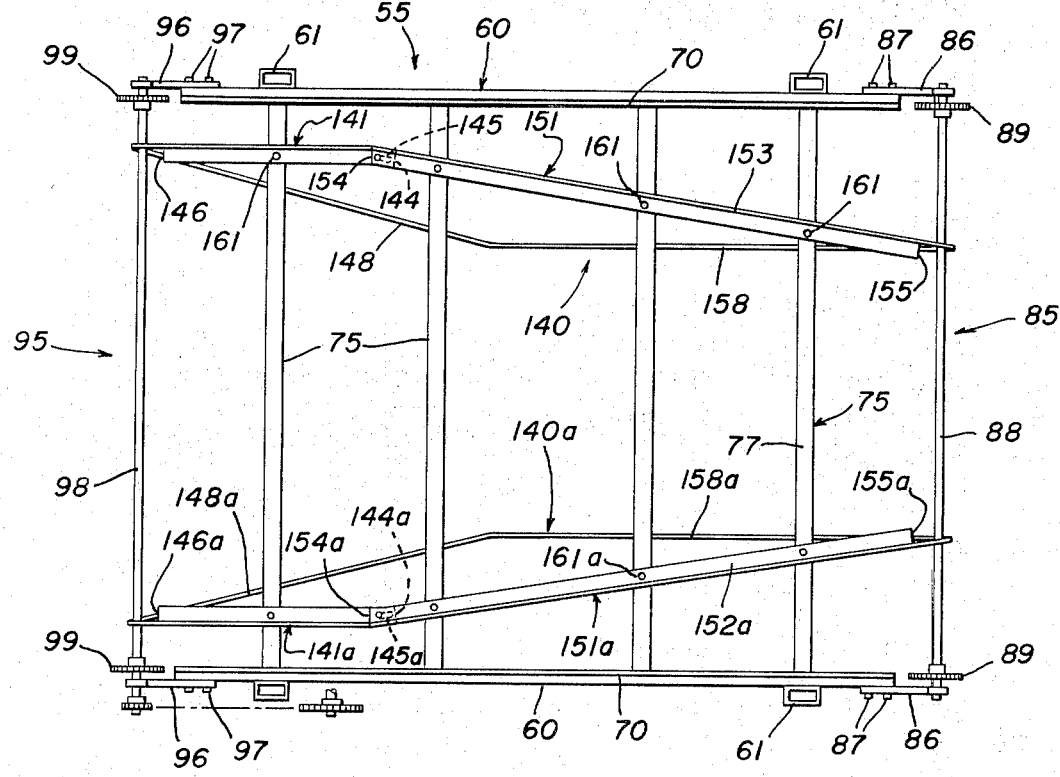
FIG. 2 is a top plan view of the frame for the conveyor shown in FIG. 1.
Figure 3:
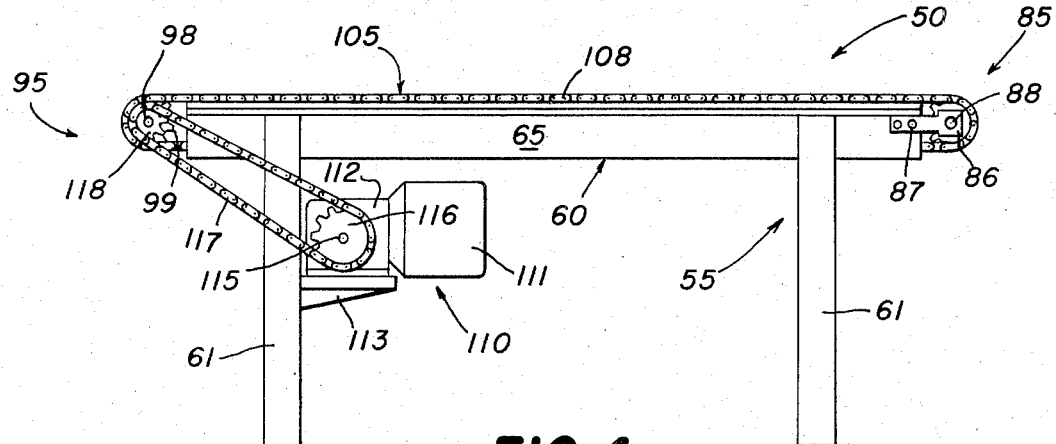
FIG. 3 is a side elevational view of the conveyor shown in FIG. 1, particularly illustrating the drive mechanism therefor.

Referring now to FIGS. 1–3 and 6 of the drawings, there is shown a converging-diverging conveyor 50 including a frame 55. The frame 55 is comprised of two spaced apart and parallel side plates 60 supported by four legs 61 positioned near the end of each of the side plates 60. Each of the side plates 60 includes a flat portion 65 having an upward slanting flange portion 66 with a vertically positioned rail 67 extending therefrom. Integral with the flat portion 65 of each ot the side plates 60 is a V-shaped member 68 which has a vertically positioned rail 69 extending therefrom and spaced parallel to the rail 67. It is seen, therefore, that there are two spaced apart and parallel rails 67 and two spaced apart and parallel rails 69, with the rails 67 coplanar, the rails 69 coplanar and respective portions of the rails 67 and 69 in registry.

Figure 5:
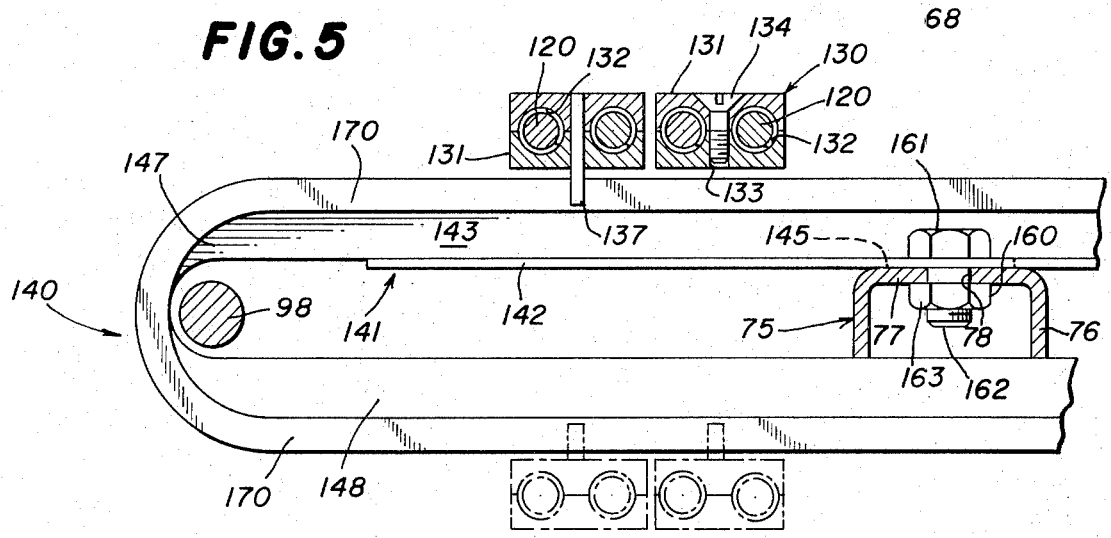
FIG. 5 is a side elevational view partly in sections of the conveyor shown in FIG. 1 as seen in the direction of lines 5—5 thereof.

The side plates 60 are preferably made of a sheet metal and are provided with a guide structure 70 in the shape of a U-shaped piece mounted on each of the rails 67 and are further provided with a second guide structure 71 also in the form of a U-shaped piece mounted on the rails 69. The guide structures 70 and 71 are preferably made of a synthetic organic resin such as Nylon or the like. The frame 55 further includes a plurality of parallel and spaced apart transverse support members 75, each support member being U-shaped and having parallel spaced apart legs 76 interconnected by a bight 77. Each of the tranverse support members 75 is fixably secured to the side plates 60 by means of welds 79, see FIGS. 6 and 7, and each of the transverse supports is also provided with a plurality of apertures 78, see FIG. 5, all for purposes hereinafter set forth.

An infeed station 85 is provided at one end of the converging-diverging conveyor 50. At the infeed station 85 there is provided an extension plate 86 on each of the side plates 60 extending parallel to and outwardly away therefrom. The extension plates 86 are each fixedly mounted on the respective side plates 60 by means of bolts 87, the extension plates supporting a shaft 88 journaled therein for rotation with respect thereto. The shaft 88 is provided with two spaced-apart sprockets 89 fixedly mounted thereto, each of the sprockets being positioned adjacent to a respective one of the extension plates 86. There is further provided a discharge station 95 for the conveyor 50, the discharge station being at the other end of the conveyor away from the infeed station 85. At the discharge station 95 there is provided an extension plate 96 fixedly mounted to each of the side plates 60, which end plate extends outwardly therefrom, the extension plates 96 being mounted by means of bolts 97. A shaft 98 is journaled for rotation in the extension plates 96 and is provided with two spaced apart sprockets 99 fixedly mounted thereto. The sprockets 99 are in alignment with the sprockets 89, all for a purpose hereinafter set forth.

Figure 4:
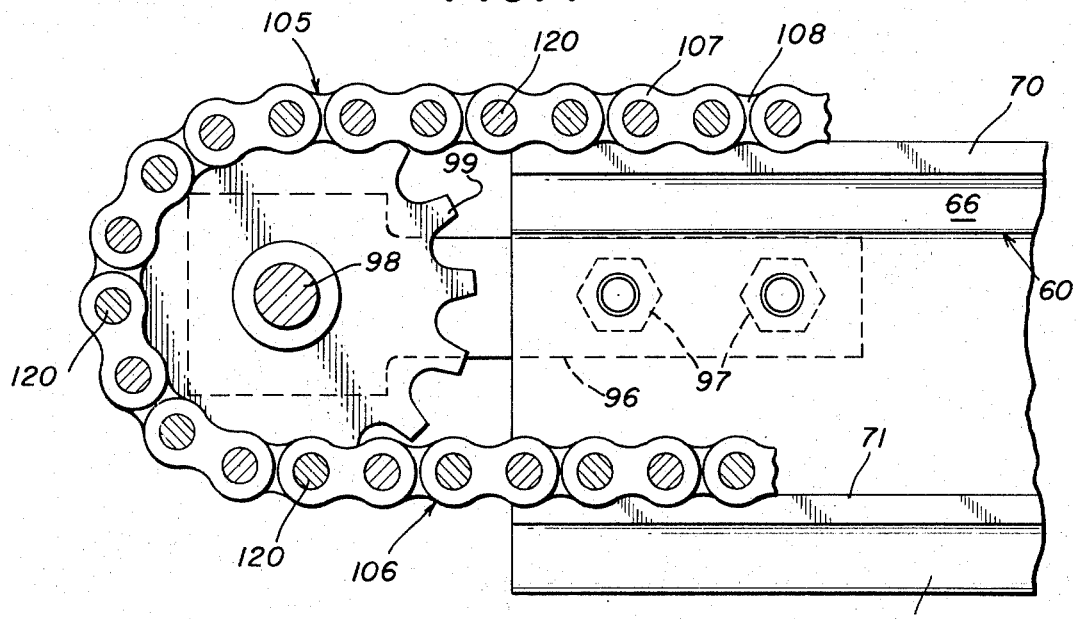
FIG. 4 is a side elevational view partly in section of the conveyor shown in FIG. 1 as viewed along lines 4—4 thereof.

Each of the sprockets 89 is connected to a respective one of the sprockets 99 by means of a hollow pin chain 105, the chains 105 each being in the form of a loop extending around the aligned sprockets 89 and 99 thereby to provide communication therebetween. The hollow pin chains 105 each consists of a plurality of double pin members 106, see FIGS. 4 and 7, each of the double pin members including two pin housings 107 and being connected by a pair of links 108. The hollow pin chains 105 are each constructed to ride upon the rails 67 and 69 and more particularly the guide structures 70 and 71 in a closed loop path between the infeed station 85 and the discharge station 95.

A drive mechanism 110 is provided for the chains 105, which drive mechanism includes a motor 111 connected to a gear reducer 112 which is fixedly mounted to a support 113 connected to the legs 61 adjacent to the discharge station 95 on the conveyor 50. Extending outwardly from the gear reducer 112 is an output shaft 115 having a sprocket 116 fixedly mounted thereto to rotate therewith. A drive chain 117 interconnects the sprocket 116 with a sprocket 118 fixedly mounted on the shaft 98 and outwardly disposed of the adjacent extension plate 96, see FIG. 1. It is seen, therefore, that rotation of the output shaft 115 of the gear reducer 112 results in rotation of the sprocket 116 and movement of the drive chain 117. Rotation of the drive chain 117 results in rotation of the sprocket 118 which in turn rotates the shaft 98. Since the sprockets 99 are fixedly mounted on the shaft 98 and the sprockets 99 are interconnected to the sprockets 89 by means of the hollow pin chains 105, it is seen that rotation of the output shaft 115 of the gear reducer 112 results in movement of the chain 105 along its closed loop path between the infeed station 85 and the discharge station 95.

The converging-diverging conveyor 50 is further provided with a plurality of elongated rods 120, each of the rods 120 extending between and being housed in opposed pin housings 107 in the hollow pin chains 105. It is seen that each of the rods 120 extends from side plate 60 to side plate 60 and is carried by the chains 105 from the infeed station 85 to the discharge station 95 in the closed loop path formed by the chains 105. Each of the elongated rods 120 is provided with an elastic support member in the form of a spring 125 positioned therearound, the springs 125 being somewhat loosely positioned around the elongated rods 120 so as to be slidable with respect thereto with the turns of the springs forming support points for the articles transported and being interacting, for a purpose hereinafter set forth.

Figure 6:
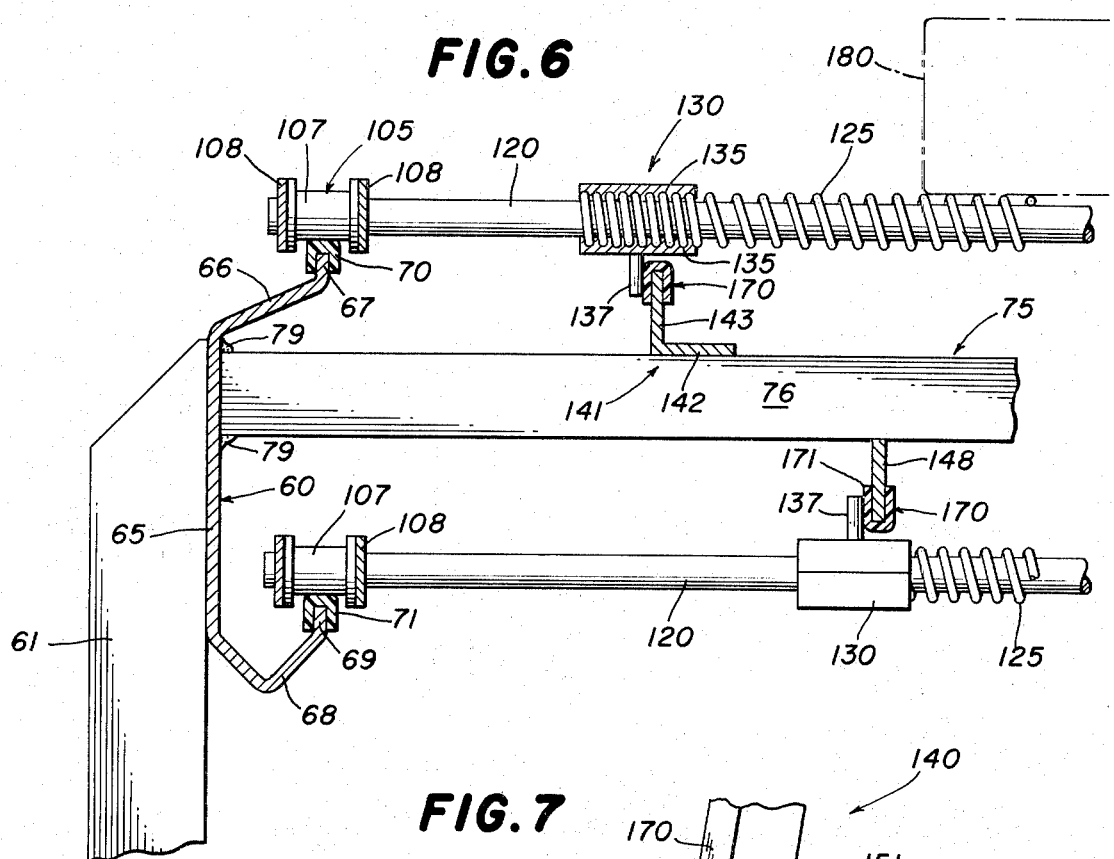
FIG. 6 is an end elevational view partly in section of the conveyor illustrated in FIG. 1 as seen along lines 6—6 thereof.
Figure 7:
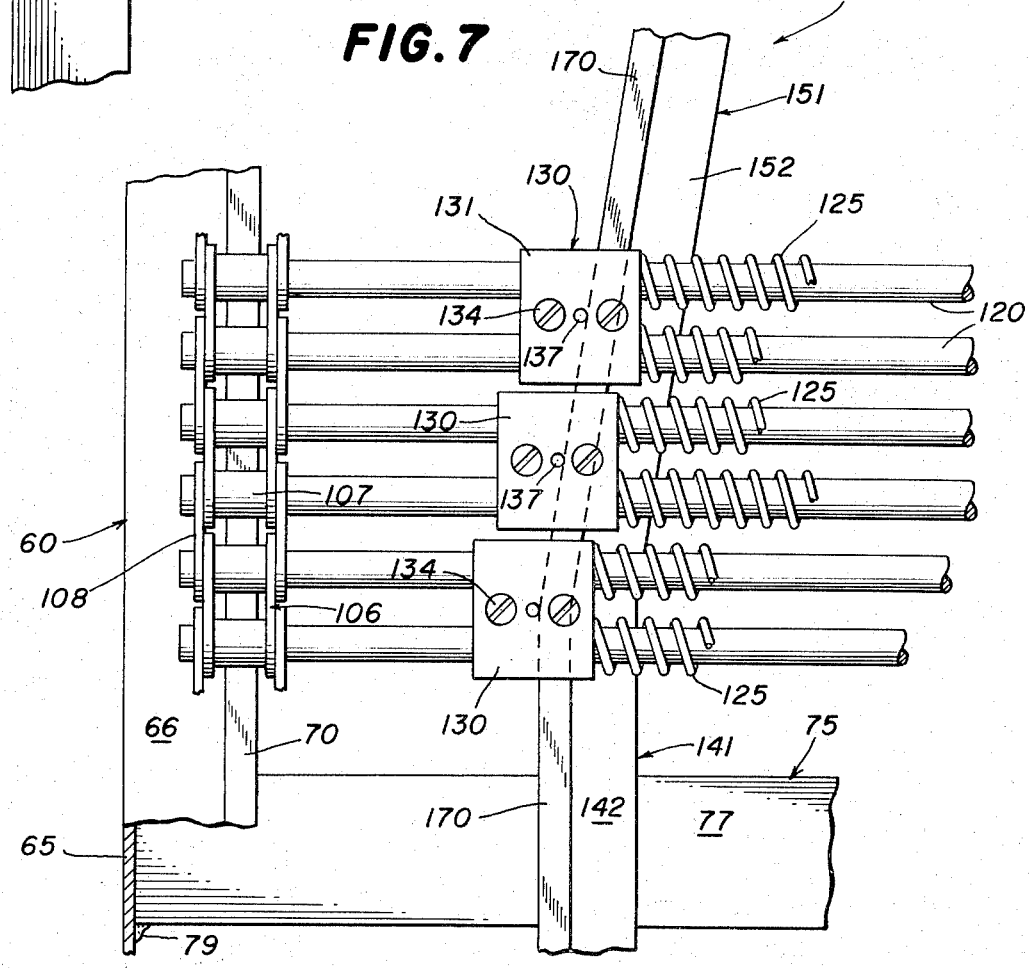
FIG. 7 is an enlarged top elevational view of a portion of the conveyor illustrated in FIG. 1.

Each of the springs 125 is connected to a fixture 130 at each end thereof, see FIG. 1 and 5 thru 7. The fixtures 130 each includes a split body portion 131 consisting of two identical halves. Each of the body pieces 131 is provided with two hemicylindrically shaped grooves 132 aligned in side by side relation and extending from one end of the fixture to the other end of the fixture, each of the grooves 132 providing a plurality of ridges 135 constructed and arranged to receive therein convolutions of the spring 125. Further, each of the body pieces 131 is provided with two spaced apart apertures 133, each of which receives therethrough a screw 134 to maintain the spring within the body pieces 131 and to slidably mount each of the fixtures onto the associated elongated rod 120. Additionally, each of the fixtures 130 is provided with a finger 137 extending perpendicularly away therefrom, the finger 137 extending downwardly when the associated elongated rod 120 is above the horizontal supports 75 of the frame 55, as seen in FIG. 6, and the finger 137 extending upwardly when the associated elongated rod 120 is below the horizontal supports 75 also as seen in FIG. 6.

The conveyor 50 is further provided with a guide structure 140 and 140a. The guide structures 140 and 140a are mirror images one of the other, the guide structures 140 and 140a consisting of two spaced apart and complementary shaped pieces, each of which includes an L-shaped flange 141 and 141a positioned near the discharge end 95 of the conveyor 50. Each of the L-shaped flanges 141 and 141a of the guide structure 140 includes a horizontally disposed leg 142 and 142a which rests upon the horizontal support 75 and more particularly the bight portion 77 thereof and a vertical leg 143 and 143a extending perpendicularly to the leg 142 and 142a respectively. It is seen that each of the L-shaped flanges 141 and 141a is positioned parallel to the respective side plate 60, the L-shaped flanges being spaced apart a predetermined distance. Further, each of the L-shaped flanges 141 and 141a has a slot 145 and 145a therein respectively positioned adjacent to an end 144 and 144a thereof, the flange also having an end 146 and 146a being positioned adjacent to the discharge station 95. The vertically positioned leg 143 of each of the L-shaped flanges 141 and 141a respectively tapers as it extends away from the edge 146 and 146a of the horizontal leg 142 and 142a, the taper being shown in FIG. 5 and labelled 147. The leg 143 in actuality is a continuous member which extends around the shaft 98 to form a vertical leg 148 and 148a respectively extending from the shaft 98 rearwardly and angularly toward the center between the two side plates 60. It is seen, that the two L-shaped flanges 141 and 141a are parallel one to the other and positioned adjacent to the respective one of the side plates 60 while the legs 148 and 148a extend angularly with respect to the L-shaped flanges 141 and 141a toward the center of the conveyor 50, all for purpose hereinafter set forth.

The guide structure 140 further includes a second pair of L-shaped flanges 151 and 151a, each of which is connected to a respective one of the flanges 141 and 141a and extends therefrom toward the infeed station 85 of the conveyor 50. More specifically, the L-shaped flanges 151 and 151a both include a horizontally disposed leg 152 and 152a which rests upon the horizontal or transverse support 75 and specifically the bight portion 77 thereof. The L-shaped flanges 151 and 151a also include a leg 153 and 153a perpendicular to the leg 152 and 152a respectively and extending upwardly therefrom. Each of the horizontal legs 152 and 152a of the L-shaped flanges 151 and 151a have an end 154 and 154a which overlaps the end 144 and 144a of the adjacent L-shaped flange 141 and 141a, the legs 152 and 152a having an aperture therethrough into which may be positioned a bolt securing the flanges 151 and 151a to the flanges 141 and 141a respectively. Further, each of the L-shaped flanges 151 and 151a has an end 155 and 155a thereof adjacent to the infeed station 85, but the vertically positioned legs 153 and 153a of each of the L-shaped flanges extends beyond the edges 155 and 155a toward the infeed station and around the shaft 88, the legs 153 and 153a being tapered in the same manner as the leg 143. Inwardly from the shaft 88 the legs 158 and 158a, similar in construction to the legs 148 and 148a, extend toward the discharge station 95 until the legs 158 and 158a meet and are jointed to the legs 148 and 148a respectively thereby to provide the loops for the guide structure 140.

The guide structure 140 is held in position by means of a plurality of fasteners 160 extending through apertures in the horizontal legs 142 and 152 of the L-shaped flanges 141 and 151 respectively and through apertures in legs 142a and 152a and being secured through the apertures 78 in the transverse support members 75, each of the fasteners 160 including a head portion 161, a shank portion 162 extending through the apertures 78 and into the horizontal leg 142 or 152 and 142a or 152a and a nut 163 threadably secured onto the shank 162. Since there are a plurality of apertures 78 in each of the transverse support members 75, it is possible to position the guide structure 140 and more specifically the L-shaped flanges 141 and 141a and 151 and 151a in various angular positions with respect to the side plates 60, all as hereinafter set forth. There is further provided a continuous member 170 in the form of a U-shaped piece 171 which fits over the exposed end of each of the legs 143, 143a, 153, 153a, 148, 148a, 158 and 158a of the guide structure 140. It is pointed out that there are two continuous loops 170 and 170a to accommodate the two guide structures 140 and 140a.

The operation of the converging-diverging conveyor 50 will now be explained. When the drive mechanism 110 is actuated, the output shaft 115 of the gear reducer 112 rotates thereby also rotating the sprocket 116 fixedly mounted thereon. Since the sprocket 116 is connected to the sprocket 118 fixedly mounted on the shaft 98, rotation of the sprocket 116 will result in rotation of the sprocket 118 and the shaft 98. More specifically, the shaft 98 rotates in a counter-clockwise direction as viewed in FIG. 3 thereby to move the elongated rods 120 along a predetermined path from the infeed station 85 to the discharge station 95.

Since each of the elongated rods 120 is mounted within opposed pin housing 107 in the two hollow pin chains 105 interconnecting the sprockets 99 with the sprockets 89, movement of the sprockets 99 results in movement of the pin chains 105 and thereby the elongated rods 120 carried thereby. Each of the elongated rods 120 carries therearound a spring 125, the normal extension of the springs 125 being that shown at the infeed station 85. As the individual elongated rods 120 move from the infeed station 85 to the discharge station 95 the springs 125 positioned around each of the elongated rods are caused to expand due to the support structure 140 and the fixtures 130 positioned on each end of the springs 125.

More specifically, each of the fixtures 130 is fixedly maintained on the end of the associated spring 125 by the grooves 135 on the inside surface of the two body sections 131 and the screws 134 which clamp together the two body sections 131 of the fixture 130 around the end of the spring 125. Since the springs 125 are slidable with respect to the elongated rods 120 and the pressure between the two body sections 131 provided by the screws 134 is adjusted not to clamp the springs to the elongated rods, both the springs and the fixtures positioned on both ends thereof remain slidable with respect to the elongated rods. As each of the fixtures 130 has a finger 137 extending outwardly therefrom that contacts the guide 170 positioned over the L-shaped flanges 141, 141a, 151 and 151a as well as the legs 148, 148a, 158 and 158a, the fixtures 130 and therefore the spring 125 connected therebetween will follow the guide structure 140 and 140a. As hereinbefore set forth, the unextended length of the spring 125 is that shown at the infeed station 85; therefore, the widening of the distance between the fixtures 130 associated with each of the springs 125 due to the divergence of the two spaced apart guide structures 140 and 140a results in expansion of the fixtures 130 on each of the rods 120 and an increased tension applied to the fixtures by the spring 125. This increased tension is sufficient continually to urge the fingers 137 of each of the fixtures 130 into contact with the guide structures 140 and 140a, thereby to allow the conveying surface formed by the springs 125 to expand or contract in response to the position of the guide structures.

As seen in FIG. 1 articles 180 positioned on the conveying surface formed by the individual springs 125, and more particularly the turns of springs which form the points of support for the articles at the infeed station 85 are transported in the direction of the arrow 190 to the discharge station 95 of the conveyor 50. Since the springs 125 are elastic and the points of support diverge during the movement of the elongated rods 120 from the infeed station 85 to the discharge station 95, the articles 180 positioned thereon diverge with the springs 125 thereby separating the articles 180 one from the other a distance directly proportional to the divergence of the springs 125. If the articles 180 are to be converged then the conveyor moves in the direction of the arrow 195.

When the articles 180 reach the discharge station 95 they may be removed from the conveyor 50 in the usual manner. The individual elongated rods 120 carrying the springs 125 and the fixtures 130 thereon pass around the shaft 98 and more specifically around the sprockets 99 mounted thereon. Although the fixtures 130 and the spring 125 on each of the elongated rods 120 are free to slide along the rod, neither the fixtures or the spring rotates during the change of direction of the rod as it is carried by the chains 105 over the sprocket 99 on the return trip to the infeed station 85. Because of this fact, the fingers 137 on the fixtures 130 remain in contact with the guide structures 140 and 140a and more particularly the members 170 and 170a.

In the example illustrated, the conveying surface formed by the turns of the springs 125 is the widest at the discharge station 95 and thereafter converges during the return thereof to the infeed station 85. To this end, the legs 148 of the guide structures 140 and 140a converge from the discharge station 95 on the return trip to the infeed station 85. Following the entire path from the infeed station 85 to the discharge station 95 and on the return therefrom to the infeed station, the fixtures 130 on each of the elongated rods 120 are continually urged against the guide structures 140 and 140a and more particularly the members 170 and 170a by the associated springs 125, thereby to vary the distance between the support points of the springs by controlling the distance between two points on the springs, which in this embodiment is the ends thereof.

While it is apparent that the conveying surface provided by the plurality of springs 125 will diverge or converge in response to the position of two spaced-apart points thereon and more particularly to the position of the fixtures 130, it should be noted that the position of the guide structures 140 and 140a controls the position of the fixtures and may be varied according to preference. The guide structures 140 and 140a are maintained in place by means of the fasteners 160 which connect the flanges 141 and 141a and 151 and 151a to the transverse supports 75. As hereinbefore set forth, there are a plurality of apertures 78 in each of the bight portions 77 of the transverse supports 75 thereby to allow for movement of the guide structures 140 and 140a along the support structure 75 toward and away from the adjacent side plates 60. Movement of the guide structures 140 and 140a toward or away from each other obviously is no problem as the individual flanges 141 and 141a and 151 and 151a only have to be moved to a different aperture 78 in the supports 75. Adjustment between parts of the guide structures 140 and 140a is made only when the angle formed between the adjoining flanges 141 and 151 or 141a and 151a is changed. Change of the above identified angle is compensated for by the slots 145 and 145a and the fasteners used therewith to accommodate changes in angles between the flanges 141 and 151 and between flanges 141a and 151a, respectively.

It is seen, therefore, that the guide structures 140 and 140a are adjustable to provide a converging and diverging conveying surface which is obtainable by means of the above described specific structure and adjustment therefor. An important feature of the present invention is the ability to separate automatically the articles 180, one from the other, as they are transported from the infeed station 85 to the discharge station 95. It should be understood, of course, that if it is desired to pack the articles 180 more closely together then the direction of the movement of the conveying surface could be reversed as shown by the arrow 195 in FIG. 1.

While there has been shown an embodiment wherein each spring is positioned about an individual rod, it is intended that the invention also cover an embodiment wherein the conveying surface is defined by intermeshing oval springs with each spring positioned about two adjacent rods.

While there has been described what is at present considered to be the preferred embodiment of the present invention, it will be understood that various modifications and alterations may be made herein without departing from the true spirit and scope of the invention, and it is intended to cover in the appended claims all such modifications and alterations as fall within the true spirit and scope of the present invention.

What is claimed is:

1. A conveyor structure for converging and diverging a row of spaced-apart articles arranged transversely of a predetermined path while traveling between an infeed station and a discharge station, said conveyor comprising a plurality of elongated rods movable along the predetermined path between the infeed station and the discharge station and- and, after "supports", -mounted on the elongated rods and a plurality of elastic supports each providing a plurality of support points and each being movable along the predetermined path and forming a conveying surface for transporting a row of articles thereon from the infeed station to the discharge station, a fixture mounted to the ends of each of said elastic supports and having a finger extending therefrom, drive mechanism for moving said elastic supports along the predetermined path from the infeed station to the discharge station, and adjustable guide structure spaced away from and out of engagement with said drive mechanism and said elastic supports for controlling movement of ends of said elastic supports in a direction transverse to the predetermined path to move the support points of each elastic support toward and away from each other, said elastic supports urging said fingers into contact with said adjustable guide structure as said elastic supports move along the predetermined path, contact of the engaged ends with said guide structure to move said engaged ends away from each other correspondingly proportionately increasing the spacing between the support points of said elastic supports correspondingly to increase the space between articles on said elastic supports, and contact of the engaged ends with said guide structure to move said engaged ends toward each other correspondingly proportionately decreasing the spacing between the support points of said elastic supports correspondingly to decrease the space between articles on said elastic supports.

2. The conveyor set forth in claim 1, wherein each of said fixtures houses two elastic supports therein.

3. The conveyor set forth in claim 1, wherein each of said fixtures includes opposed clamping surfaces for clamping an elastic support therebetween and means for maintaining said clamping surfaces in claimping relation about said elastic support.

4. A conveyor structure for converging and diverging a row of spaced-apart articles arranged transversely of a predetermined path while traveling between an infeed station and a discharge station, said conveyor comprising a plurality of elongated rods movable along a predetermined path between the infeed station and the discharge station, an elastic support member slidably mounted on each of said elongated rods and providing a plurality of support points for transporting a row of articles thereon as said elongated rods move along the predetermined path from the infeed station to the discharge station, adjustable guide structure spaced away from said eleastic supports for controlling movement of ends of said elastic supports in a direction transverse to the predetermined path to move the support points of each elastic support toward and away from each other, means for maintaining contact between the ends of said elastic supports and said adjustable guide structure as said elastic supports move along the predetermined path, and drive mechanism spaced away from and out of engagement with said guide structure for moving said elastic supports along the predetermined path from the infeed station to the discharge station, contact of the engaged ends with said guide structure to move said engaged ends away from each other correspondingly proportionately increasing the spacing between the support points of said elastic supports correspondingly to increase the space between articles on said elastic supports, and contact of the engaged ends with said guide structure to move said engaged ends toward each other correspondingly proportionately decreasing the spacing between the support points of said elastic supports correspondingly to decrease the space between articles on said elastic supports.

5. A conveyor structure for converging and diverging a row of spaced-apart articles arranged transversely of a predetermined path while traveling between an infeed station and a discharge station, said conveyor having a plurality of elongated rods movable along a predetermined path between the infeed station and the discharge station, a spring mounted on each of said elongated rods and extending therealong to form a plurality of support points for transmitting a row of articles thereon during movement of said elongated rods along the predetermined path from the infeed station to the discharge station, a fixture mounted to the ends of each of said springs and having a finger extending therefrom, adjustable guide structure spaced away from said springs for controlling movement of said fixtures in a direction transverse to the predetermined path to move the support points of said springs toward and away from each other, said springs urging said fingers into contact with said adjustable guide structure as said springs move along the predetermined path, and drive mechanism spaced away from and out of engagement with said guide structure for moving said elongated rods and said springs carried thereby along the predetermined path from the infeed station to the discharge station, contact of said fingers with said guide structure to move said fixtures away from each other correspondingly proportionately increasing the spacing of the support points of said springs correspondingly to increase the space between articles on said springs, and contact of the fingers with said guide structure to move said fixtures toward each other correspondingly proportionately decreasing the spacing between the support points of said springs correspondingly to decrease the space between articles on said springs.

6. The conveyor set forth in claim 5, wherein each of said fixtures includes two opposed clamping surfaces having internal grooves therein for clamping the ends of said springs therebetween and means for maintaining said clamping surfaces clamped about said springs.

7. The conveyor set forth in claim 5, wherein said adjustable guide structure includes two spaced apart loops adjustable to provide different widths therebetween at said infeed station and said discharge station.

* * * * *

UNITED STATES PATENT OFFICE
CERTIFICATE OF CORRECTION

Patent No. 3,809,207          Dated May 7, 1974

Inventor(s) Maynard R. Euverard

It is certified that error appears in the above-identified patent and that said Letters Patent are hereby corrected as shown below:

Column 2, line 54, "ot" should be --of--;

Column 8, line 26, after "and" delete "and, after "supports", -mounted on the elongated rods and";

Column 8, line 28, after "supports" insert --mounted on the elongated rods and--; and Column 8, line 63, "claimping" should be --clamping--.

Signed and sealed this 10th day of September 1974.

(SEAL)
Attest:

McCOY M. GIBSON, JR.          C. MARSHALL DANN
Attesting Officer             Commissioner of Patents